US008922333B1

(12) United States Patent
Kirkjan

(10) Patent No.: US 8,922,333 B1
(45) Date of Patent: Dec. 30, 2014

(54) CONTACTLESS ELECTRONIC ACCESS CONTROL SYSTEM

(71) Applicant: Gregory Paul Kirkjan, Coachella, CA (US)

(72) Inventor: Gregory Paul Kirkjan, Coachella, CA (US)

( * ) Notice: Subject to any disclaimer, the term of this patent is extended or adjusted under 35 U.S.C. 154(b) by 0 days.

(21) Appl. No.: 14/023,248

(22) Filed: Sep. 10, 2013

(51) Int. Cl.
*G05B 19/00* (2006.01)
*G07C 9/00* (2006.01)

(52) U.S. Cl.
CPC .................................. *G07C 9/00182* (2013.01)
USPC ............. 340/5.1; 340/5.3; 340/5.7; 340/10.1; 340/10.33; 340/10.34; 235/376; 235/380; 235/439; 235/450; 705/75; 705/77; 705/79; 70/277; 70/283.1

(58) Field of Classification Search
CPC .......... G06K 7/10366; G06K 7/10009; G06K 7/0008; G06K 19/0723; G06K 7/01; G06K 5/00; E05B 47/0012; E05B 2047/0058; E05B 47/0001; E05B 2047/0086; E05B 47/026; E05B 49/00; G07C 9/00111; G07C 9/00007; G07C 9/00174; G07C 2009/00769; G07C 9/00126; G07C 9/00142; G07C 9/00309; G06Q 20/401; G06Q 20/40; G06Q 20/20; G06Q 20/382; G06Q 20/12; G06Q 20/3823; G06Q 30/06
USPC .............................. 340/5.1–5.92, 10.1–10.6; 70/277–283.1; 235/376, 380, 439, 450; 705/75, 77, 79
See application file for complete search history.

(56) References Cited

U.S. PATENT DOCUMENTS

| | | | |
|---|---|---|---|
| 3,671,752 | A | 6/1972 | Bostrom |
| 3,733,862 | A | 5/1973 | Killmeyer |
| 4,144,523 | A | 3/1979 | Kaplit |
| 4,326,124 | A | 4/1982 | Faude |
| 4,562,712 | A | 1/1986 | Wolter |
| 4,663,952 | A | 5/1987 | Gelhard |
| 4,686,358 | A | 8/1987 | Seckinger et al. |
| 4,713,660 | A | 12/1987 | Camenzind |
| 4,833,465 | A | 5/1989 | Abend et al. |
| 5,089,692 | A | 2/1992 | Tonnesson |
| 5,140,317 | A | 8/1992 | Hyatt, Jr. et al. |
| 5,198,643 | A | 3/1993 | Miron et al. |
| 5,245,329 | A | 9/1993 | Gokcebay |

(Continued)

FOREIGN PATENT DOCUMENTS

| | | | |
|---|---|---|---|
| EP | 0 846 823 | A1 | 6/1998 |
| JP | 2008 01470 | A | 1/2008 |

(Continued)

OTHER PUBLICATIONS

"A11 Range Data Sheet", Servocell Document No. 900 004, Issue B, Mar. 31, 2005, pp. 1-5.

(Continued)

*Primary Examiner* — George Bugg
*Assistant Examiner* — Sharmin Akhter
(74) *Attorney, Agent, or Firm* — Knobbe, Martens, Olson & Bear, LLP

(57) ABSTRACT

An embodiment of an electronic access control system includes an electronic access apparatus, an electronic lock, and an access control administration program. The electronic access apparatus provides a wireless power signal and a wireless digital data signal to the electronic lock. The wireless power signal can be the only source of power used by the electronic lock to actuate an electronic lock mechanism. In some embodiments, the lock mechanism includes a piezoelectric latch.

30 Claims, 10 Drawing Sheets

(56) References Cited

U.S. PATENT DOCUMENTS

| | | | |
|---|---|---|---|
| 5,477,041 A | 12/1995 | Miron et al. | |
| 5,491,470 A | 2/1996 | Veligdan | |
| 5,493,882 A | 2/1996 | Jasper | |
| 5,905,446 A | 5/1999 | Benore et al. | |
| 6,046,558 A | 4/2000 | Larson et al. | |
| 6,382,003 B1 | 5/2002 | Watanuki et al. | |
| 6,900,720 B2 | 5/2005 | Denison et al. | |
| 6,965,295 B2 | 11/2005 | Shimonomoto et al. | |
| 6,980,672 B2 | 12/2005 | Saito et al. | |
| 7,009,489 B2 | 3/2006 | Fisher | |
| 7,009,490 B2 | 3/2006 | Wong et al. | |
| 8,035,477 B2 | 10/2011 | Kirkjan | |
| 8,347,674 B2 | 1/2013 | Trempala et al. | |
| 8,354,814 B2 | 1/2013 | Buckingham | |
| 2003/0122651 A1 | 7/2003 | Doi et al. | |
| 2005/0051621 A1 | 3/2005 | Wong et al. | |
| 2005/0184106 A1* | 8/2005 | Damrath et al. | 223/66 |
| 2006/0176146 A1 | 8/2006 | Krishan et al. | |
| 2006/0192653 A1 | 8/2006 | Atkinson et al. | |
| 2006/0261932 A1* | 11/2006 | Ando et al. | 340/426.14 |
| 2008/0157928 A1* | 7/2008 | Butler et al. | 340/10.1 |
| 2009/0256676 A1* | 10/2009 | Piccirillo et al. | 340/5.65 |
| 2010/0073129 A1 | 3/2010 | Pukari | |
| 2010/0096447 A1* | 4/2010 | Kwon et al. | 235/375 |
| 2010/0201481 A1* | 8/2010 | Au et al. | 340/5.51 |
| 2012/0001590 A1* | 1/2012 | Yeh | 320/108 |
| 2012/0047972 A1 | 3/2012 | Grant et al. | |
| 2012/0086548 A1* | 4/2012 | Kirkjan | 340/5.25 |
| 2012/0096909 A1* | 4/2012 | Hart et al. | 70/278.1 |
| 2012/0270496 A1 | 10/2012 | Kuenzi et al. | |
| 2012/0280789 A1 | 11/2012 | Gerhardt et al. | |

FOREIGN PATENT DOCUMENTS

| | | |
|---|---|---|
| WO | WO 00/09836 A1 | 2/2000 |
| WO | WO 01/23695 A1 | 4/2001 |
| WO | WO 2009/010637 A1 | 1/2009 |

OTHER PUBLICATIONS

"AL3 Data Sheet R112", Copyright 2012, RCI Rutherford Controls International Corp., Virginia Beach, VA.

Patauner, et al., "High Speed FRID/NFC at the Frequency of 13.56 MHz", Sep. 2007, Proceedings from the First International EURASIP Workshop on FRID Technology, Vienna, Austria.

* cited by examiner

Front View of door handle

Side View of Door Handle

CONTACTLESS ELECTRONIC ACCESS CONTROL SYSTEM

BACKGROUND

1. Field

This disclosure relates to the field of electronic access control and, more particularly, to contactless wireless electronic access control systems and methods for electronic locks.

2. Description of Related Art

Lock and key sets are used in a variety of applications, such as in securing file cabinets, facilities, safes, equipment, and the like. Some traditional mechanical lock and key sets can be operated without the use of electrical energy. However, mechanical access control systems and methods can be costly and cumbersome to administer. For example, an administrator of a mechanical access control system may need to physically replace several locks and keys in a system if one or more keys cannot be accounted for.

Electronic lock and key systems have also been used for several years, and some have proven to be reliable mechanisms for access control. Electronic access control systems can include an electronic key that is configured to connect to a locking mechanism via a key interface. In some electronic access control systems, the electronic key can be used to operate the locking mechanism via the key interface.

Existing electronic access control systems suffer from various drawbacks. For example, electronic lock systems can be rendered inoperable when a power source is disconnected. If the electronic access control systems use batteries or an external power source, the systems can stop operating at inopportune times, making it impossible to unlock or lock doors without dismantling the electronic access control systems.

SUMMARY

An object of some embodiments of the invention is an electronic lock that is capable of operating based on power received from an electronic access apparatus, such as an electronic key. In some embodiments, the electronic access apparatus includes a housing having a processor configured to communicate with a lock microcontroller associated with an electronic lock. The apparatus can also include a memory device storing a key identifier, a rechargeable battery configured to supply energy to components of the apparatus and an electromagnetic radiation source. The electromagnetic radiation source configured to transmit a wireless digital data signal to an electromagnetic radiation receiver, and transmit a wireless power signal to the electronic lock to provide power to the electronic lock sufficient to actuate a lock mechanism within the electronic lock. The electromagnetic radiation source is configured to transmit the key identifier to the lock microcontroller via the digital data signal. The electronic access apparatus is capable of actuating the electronic lock without any electrical conductor power connection to the electronic lock, and the apparatus and/or optical light incident on the electronic lock are the only sources of electric power for the electronic lock.

In some embodiments, the electromagnetic radiation source is an optical light source. The electromagnetic radiation source can be configured to transmit power via the optical light source. The electromagnetic radiation source can be configured to transmit the digital data signal via the optical light source. The electromagnetic radiation source configured to transmit the wireless digital data signal and the wireless power signal can be the same source.

In some embodiments the key identifier further includes one or more private identifiers that are not readily accessible to a user of the apparatus, and one or more public identifiers that are readily accessible to a user of the apparatus. The electronic access apparatus can be configured to transmit at least one private identifier and at least one public identifier to the electronic lock.

In some embodiments, the housing can include a display, the display having a user interface having a visual indication of a status of the electronic lock, and one or more control elements configured to control the operation of the electronic lock. The processor can be configured to transmit a lock instruction to the electronic lock based on an input received from a user. The electronic access apparatus can be a cellular phone, a dedicated electronic key, or other electronic apparatus. In some embodiments, the apparatus does not have a mechanical configuration that is configured to match a mating mechanical configuration of the electronic lock.

In an embodiment of an electronic lock, the electronic lock includes a lock housing and a lock mechanism electrically connected to the lock controller. The lock mechanism can be configured to actuate between a locked state and an unlocked state. The lock also includes an electromagnetic radiation receiver configured to receive a wireless digital data signal from the electronic apparatus, and receive a wireless power signal from the electronic apparatus. The lock can also include a memory device storing key access information, a lock microcontroller configured to control operation of the lock mechanism based on the digital data signal from the electronic apparatus, and a power management module configured to actuate the lock mechanism based on input received from the lock microcontroller and an electrical energy level contained in an electrical circuit of the electronic lock. The lock mechanism is capable of actuating between the locked state and the unlocked state without any electrical conductor power connection to the electronic lock, and the apparatus and/or optical light incident on the electromagnetic radiation receiver are the only sources of electric power for the electronic lock.

In some embodiments, the digital data signal comprises a key identifier, and lock microcontroller can be configured to determine whether the key identifier matches the key access information stored in the memory device. The lock mechanism can be capable of actuating between the locked state and the unlocked state with less than or equal to about 10 milliwatts of electric power, and the electronic apparatus can be greater than 0.5 centimeters from the electronic lock when providing the electric power. In some embodiments the electronic lock does not have a mechanical configuration that is configured to match a mating mechanical configuration of the electronic apparatus.

In some embodiments, the power management module can be configured to actuate the lock after the electrical energy level of the electronic lock satisfies an electrical energy level threshold. The power management module can be configured to increase the voltage to actuate the lock. The power management module can include a voltage conversion circuit that is configured to increase a voltage value to operate within the minimum and maximum parameters of the lock mechanism that allow the lock mechanism to actuate. For example, in one embodiments, the voltage conversion circuit is configured to increase a voltage value that is not greater than 2.7 volts to a voltage value between 3.6 volts and 6.8 volts.

In some embodiments, the electromagnetic radiation receiver can have various configurations. For example, the electromagnetic radiation receiver can include a photovoltaic cell, configured to convert electromagnetic radiation to energy to power the lock microcontroller. The electromagnetic radiation receiver can include an electromagnetic radiation sensor, and a signal processing circuit, wherein the signal processing circuit is configured to process a digital data signal received from the electronic apparatus. The electromagnetic radiation can be optical light. The electromagnetic radiation receiver can include an antenna configured to receive radio frequency signals. The antenna can be configured to receive the digital data signal and the power signal from the electronic apparatus. The antenna can be configured to receive the power signal from the electronic apparatus via contactless inductive coupling.

In some embodiments, the lock mechanism can be configured to toggle between a locked state and an unlocked state based on a lock instruction received from the electronic apparatus. The lock mechanism can be configured to actuate from the locked state to the unlocked state for a defined time period before returning to the locked state, such as a defined time period of less than or equal to about five seconds. In some embodiments, the lock memory device and the lock microcontroller are contained on a single integrated circuit.

One object of the invention is a method of controlling access to an electronic lock having no independent power supply. The method includes receiving, by an electromagnetic radiation receiver, electromagnetic radiation from an electronic apparatus including a power signal configured to provide power to the electronic lock. The method also includes booting a lock microcontroller after the electrical energy level satisfies a microcontroller electrical energy level threshold and receiving, by the electromagnetic radiation receiver, electromagnetic radiation comprising a digital data signal from the electronic apparatus including a key identifier. The method also includes determining, by the lock controller, whether the key identifier matches key access information stored in memory in the electronic lock and storing power received from the electronic apparatus in an electric circuit, such a reservoir capacitor, in the electronic lock. If the key identifier matches the key access information, actuating a lock mechanism when the stored power reaches an energy level threshold. The lock mechanism can be configured to actuate between a locked state and an unlocked state.

In some embodiments, the method also includes shutting down the lock microcontroller if the key identifier does not match the key access information. The electronic apparatus does not need to mechanically or physically make contact to the electronic lock to transfer the digital data signal and the power signal.

For purposes of summarizing the invention, certain aspects, advantages and novel features have been described herein. Of course, it is to be understood that not necessarily all such aspects, advantages or features will be embodied in any particular embodiment. Moreover, it is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are reused to indicate correspondence between referenced elements.

DETAILED DESCRIPTION OF PREFERRED EMBODIMENTS

Figure 1:
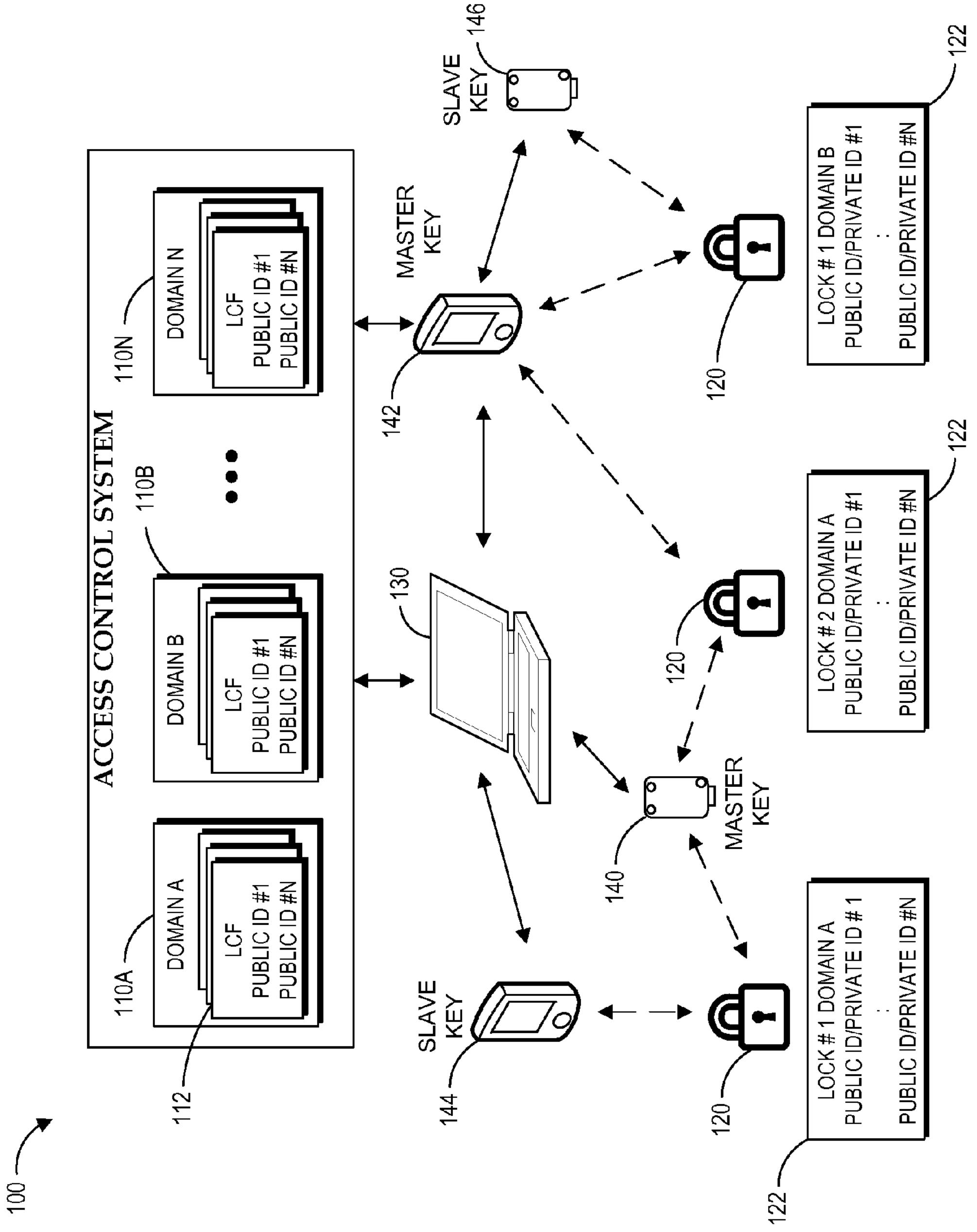
FIG. 1 illustrates an example embodiment of an operating environment for an access control system.

Systems and methods which represent various embodiments and example applications of the present disclosure will now be described with reference to the drawings.

For purposes of illustration, some embodiments are described in the context of access control systems and methods incorporating a wireless communication connection. The wireless connection can be configured to comply with one or more wireless standards, such as, for example, Near Field Communication (NFC), Bluetooth, IEEE 802.11 technical standards ("WiFi"), and so forth. In some embodiments a Universal Serial Bus (USB) connection is used. The USB connection can be configured to comply with one or more USB specifications created by the USB Implementers Forum, such as, for example, USB 1.0, USB 1.1, USB 2.0, USB 3.0, USB On-The-Go, Inter-Chip USB, MicroUSB, USB Battery Charging Specification, and so forth. The present invention is not limited by the type of connection which the systems and methods employ. At least some of the systems and methods may be used with other connections, such as, for example, an IEEE 1394 interface, a serial bus interface, a parallel bus interface, a magnetic interface, a radio frequency interface, a wireless interface, a custom interface, and so forth. The system may include a variety of uses, including but not limited to access control for buildings, equipment, file cabinets, safes, doors, padlocks, etc. It is also recognized that in other embodiments, the systems and methods may be implemented as a single module and/or implemented in conjunction with a variety of other modules. The embodiments described herein are set forth in order to illustrate, and not to limit, the scope of the invention.

The access control system as contemplated by at least some embodiments generally includes an electronic lock and an electronic access apparatus. The electronic access apparatus can also be referred to as an electronic key or a smart phone. The electronic lock and the electronic access apparatus are configured to communicate with each other via a wireless interface without a mechanical interface. The electronic lock can include, for example, an electronic lock mechanism, such as a latch, an electronic access interface or connector, a controller (e.g., a microcontroller), program modules, nonvolatile memory including lock configuration information, key access information, an access log, and other information stored thereon, other mechanical and/or electrical components. In some embodiments, the electronic lock mechanism can include, for example, a piezoelectric latch or another type of energy-efficient latch, motor or actuator. The wireless interface can include, for example, antennas, sensors, photovoltaic cells, radio frequency identification (RFID) and near field communication (NFC) interface components, signal processing components (e.g., a signal processing circuit), and/or other wireless interface components. Functional components can be integrated into a single physical component. For example, the memory of the lock may be embedded on the same integrated circuit as the controller.

In some embodiments, the electronic access apparatus can include, for example, a wireless transceiver, an electromagnetic signal source (e.g., a light source or radio frequency generator), a key housing, a microcontroller, program modules, a lock interface or connector, a power source, a memory card slot, a memory device having one or more key identifiers, lock configuration files containing key access information for a lock, mechanical and/or other electrical components. Some embodiments of the electronic access apparatus can also include a battery, a battery charger, a digital bus connector, circuitry to detect when the electronic access apparatus is connected to another device, memory integrated with the microcontroller, a storage device controller, a file system, and/or program logic for determining what actions to perform in response to conditions or events. In some embodiments the electronic access apparatus can be a general purpose computing device, such as, for example, a cellular phone, a smart phone, a tablet computer, a laptop, or other computing device. In some embodiments the electronic access apparatus can be a dedicated electronic access device, where the primary purpose of the device is to provide access to one or more electronic access systems.

In some embodiments, the access control system includes an application program for managing access between electronic locks and electronic keys. The access control system can operate on one or more computing systems. In some embodiments, the access control system can be configured to operate in a distributed network environment. The access control system can be used to create domains and/or lock configuration files. The files can be stored on electronic keys, and or other computing devices. In some embodiments, the access control system can manage a plurality of domains so that key access information for groups of electronic locks and keys to be managed more efficiently. For example, a domain can include access control information for a plurality of locks and keys, while an individual lock configuration file may contain access control information for a single lock in the domain.

FIG. 1 illustrates an example embodiment of an access control system 100 configured to have a plurality of domains 110A-N. Each domain 110 is associated with a controlled access environment, such as, for example, a residence, an office building, or other defined environment. The domain 110 can include one or more locks 120, such as, for example, pad locks, door locks, cabinet locks, equipment locks, or other types of locks. The domains 110 can have a lock configuration file 112 associated with each lock 120. The lock configuration files 112 store the public identifiers associated with each lock. Each lock 120 can have a key access information file 122. The key access information 122 stores public identifiers and private identifiers. A different access control system can be associated with each master key.

In the embodiment shown in FIG. 1, master keys 140, 142 are associated with the first domain 110A and master key 142 is also associated with the second domain 110B. Master keys have privileges to perform administrative functions on the locks in a domain. For example, in some embodiments, master keys can access, erase, program, or reprogram locks in a domain. Thus, the master keys 140, 142 in the first domain 110A are able to perform any of the master key functions on locks 120A, 120B. Master keys can also have administrative privileges in other domains. For example, master key 140 can access lock 120C in the second domain 110B. However, in some embodiments master key may not have administrative privileges in more than one domain, such that the master key can only access the locks but not erase, program, or reprogram the lock and act as a slave key.

The domains can have slave keys 144, 146. Slave keys can have privileges to access one or more locks in a domain but do not have privileges to perform administrative functions. In some embodiments, an access control system administrator can set up a domain such that slave keys have access to only a portion of the locks in a domain. In some embodiments, a slave key can have access privileges to locks in multiple domains.

The master keys and slave keys can wirelessly communicate with the locks using electromagnetic signals. The computing devices, master keys and slave keys can also wirelessly communicate with each other via a wireless communication protocol, such as Bluetooth, NFC, RFID, or other wireless communication protocol that uses electromagnetic signals for purposes of synchronizing domain and lock configuration files via the application. The electromagnetic signals may take any suitable form, such as radio frequency (RF) signals, light signals, etc. In some embodiments, the keys can physically couple to the lock using an appropriate physical connector such as a USB connector.

In some embodiments, each of the domains 110A-N is associated with a domain file. The domain file can contain information associated with a domain of the access control system 100, including, for example, key users and locks in a domain. One or more lock configuration files 112 can also be associated with each domain. In some embodiments, a lock configuration file contains key access information associated with an electronic lock. The domain file can be created or modified by an access control administration application program (an "admin application"). In some embodiments, the administrative application and the domain file can be stored on a master key 142, such as an electronic access apparatus (e.g., a cell phone or electronic key), on a computer 130, or on both. In some embodiments, master keys have administrative privileges only in the domains in which they are assigned. In some embodiments, master keys and slave keys can have access privileges for locks in any domain. A domain file can be password protected to increase the security of an access control system. In some embodiments, a person possessing a master key is allowed to use the admin application to modify the domain file and lock configuration files on the master key. For example, the person could reconfigure the domain file and lock configuration files to remove other master keys from the domain. In some embodiments, the user can directly edit domain files and lock configurations via an application on the computing device or directly with the electronic access apparatus (e.g., an app on a smart phone). However, in some embodiments, a person must also know a domain password in order to be able to modify the domain file and lock configuration files or access the application. In this embodiment the access control system 100 can be stored locally on the electronic apparatus (e.g., key, smart phone, computer). The electronic apparatus can communication via a wired or wireless connection to program and synchronize of the master and slave keys devices.

Figure 2:
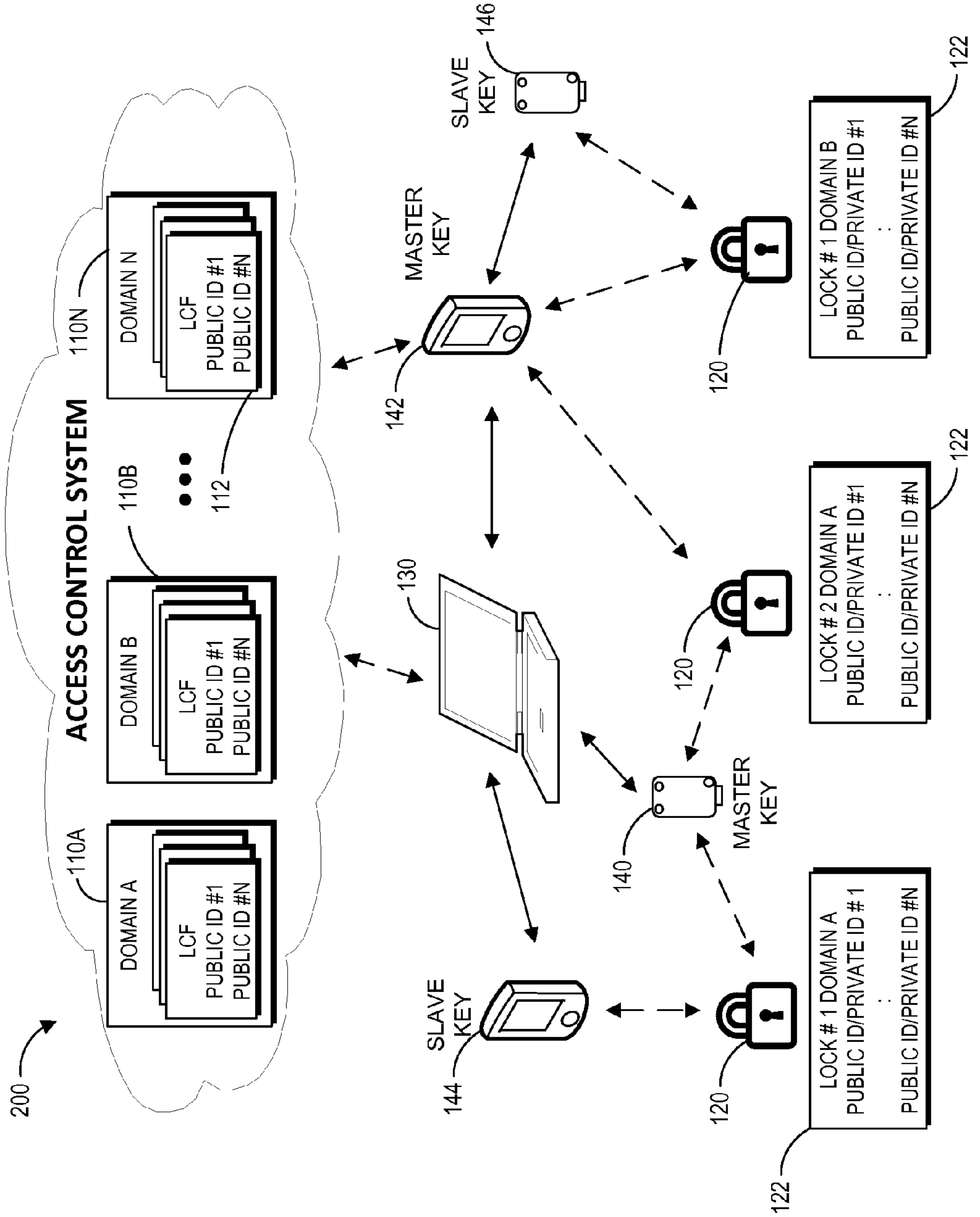
FIG. 2 illustrates an example embodiment of an operating environment for an access control system in a distributed networking environment.

FIG. 2 illustrates an embodiment of and access control system 200 operating in a distributed operating environment. In the distributed operating environment the master keys and slave keys function in the same manner as described in association with FIG. 1. However, in the distributed operating environment, the access control system 200 is accessible over a network using an account-based system. The account-based system allows computing device to access the access control system information over a network (e.g., the Internet). The access control system 200 stores domain information, associated lock configuration files, and other associated information on a remote computing device, such as a server. The access control system 200 has a network-based user interface that allows a user to login to an account. The account can be an administrator account, also referred to as a master account or a user account. The account can have one or more domains associated with the account. Each domain can have one or more locks associated with the account. An account with administrator privileges for a domain can manage the domain and lock configuration files. The access control system 200 can be used to provide the files onto a local computing device in order to program and access the locks within a domain.

The access control system can use public identifiers and private identifiers to determine access to the locks. Additional information regarding using public identifiers and private identifiers is provided in U.S. Pat. No. 8,035,477, which is incorporated by reference in its entirety.

Figure 3:
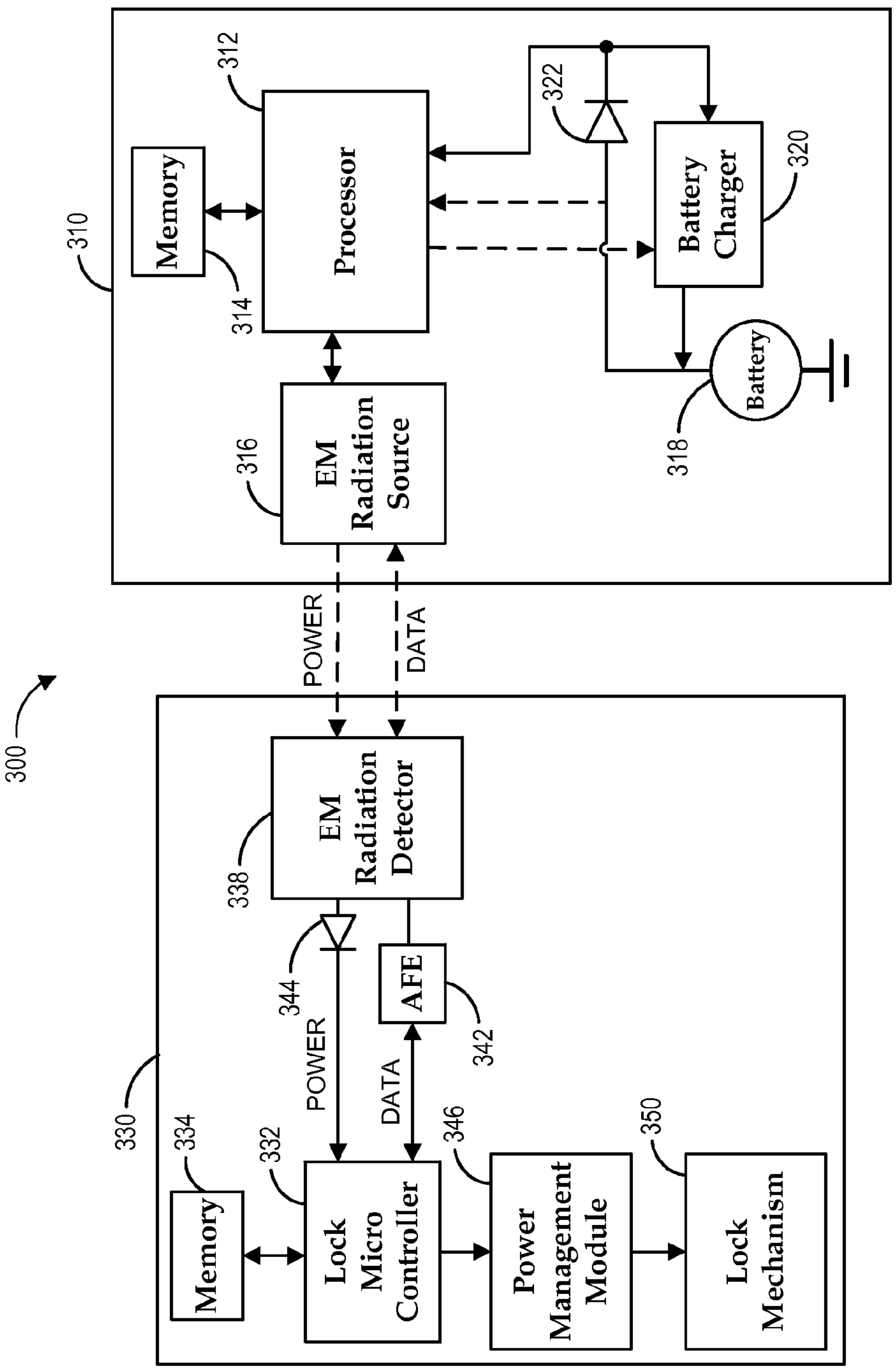
FIG. 3 is a detailed block diagram of an embodiment of an electronic lock and an electronic access apparatus.

FIG. 3 is a block diagram of an embodiment of an electronic lock and key system 300 including an electronic access apparatus 310 and an electronic lock 330. The electronic access device 310 can include a housing that contains a processor 312 that is connected to a memory 314. The electronic access device 310 can be a dedicated electronic key (e.g., a single purpose computing device), a mobile computing device, such as a cellular phone, a smart phone, or other computing device capable of communicating with the electronic lock 330. In some embodiments, the processor is a microcontroller 312. The memory 314 can be a nonvolatile memory device, such as NAND flash memory. The memory 314 can also include a memory card or other removable solid state media such as, for example, a Secure Digital card, a micro Secure Digital card, etc. The microcontroller 312 can also have an optional integrated memory (not shown). In some embodiments, the electronic access device 310 can include a display. The display can be a LED, LCD, touch screen display, or other type of display. In some embodiments the electronic access device 310 can have one or more buttons or controls can be configured to operate the electronic access device 310. In some embodiments the buttons or controls can be integrated into the display.

The processor 312 forms part of a circuit that can include a diode 322, such as a Schottkey Diode, a battery charger 320, a battery 318, and other circuit components such as resistors, a ground plane, pathways of a lock connector, and other pathways. In one embodiment, the electronic access apparatus 310 includes an external lock connector, such as, for example, a physical connector that is compatible with a USB connector.

The battery 318 can be any suitable rechargeable battery, such as, for example, a lithium-ion battery, and can be configured to provide a suitable electric potential, such as, for example, 3.7 volts. The battery 318 can be placed between a ground, such as Pin 4 of the USB connector, and a diode 322. The electronic access apparatus can also include a detection circuit. For example, a reference integrated circuit or a Zener diode or voltage reference derived from the power bus feeding (or Pin 1) can be provided to a reference input for a comparator. The diode 322 can be a diode with a low forward voltage drop, such as, for example, a Schottky diode, an energy efficient diode, or another type of diode. In some embodiments, another type of switching device can be used in place of the diode 322. The diode 322 is oriented to allow current to flow from the battery 318 to the electrical input of the microcontroller 312 and the battery charger 320. The output of a detection circuit can be connected to a computer mode interrupt or reset of the key microcontroller.

The electronic access apparatus 310 includes an electromagnetic radiation source 316 that is configured to transmit electromagnetic radiation, such as radio frequency signals, optical light signals, and other electromagnetic radiation. The electromagnetic radiation source 316 can be an optical light source, such as a light on a cellular phone, flashlight, an antenna, or other source capable of transmitting electromagnetic radiation. In some embodiments, the electromagnetic radiation source can transmit and receive electromagnetic radiation. For example, in some embodiments the electromagnetic radiation source 316 can be configured to send and receive signals based on radio frequency identification (RFID) and near field communication (NFC) standards. In some embodiments, a photocell, antenna, or sensor can be used to receive data transmitted by an electromagnetic radiation receiver 338 on the electronic lock 330.

The electromagnetic radiation source 316 is configured to transmit a power signal and a wireless digital data signal to the electronic lock 330. The electromagnetic radiation source 316 is configured to transmit a power signal to the electromagnetic radiation receiver 338 on the electronic lock 330. The wireless digital data signal is configured to communicate information for accessing and programming the lock 330. If the electronic access apparatus 310 is a master key, the digital data signal can include information such as a key access information file that is used to program the electronic lock. If the electronic access apparatus 310 is a slave key or a master key being used to access the electronic lock, the digital data signal can include key identifiers, such as a public identifier and a private identifier. In some embodiments one or more, public and private identifiers can be sent to the electronic lock. In some embodiments, only the private identifier or identifiers are sent. The digital data signal can include a lock instruction that instructs the lock 330 to lock, unlock, or temporarily unlock. In some embodiments, the lock 330 toggles the current state of the lock (e.g., from lock to unlock or visa-versa) without receiving a lock instruction from the key 310.

The electromagnetic radiation source 316 is configured to transmit a wireless power signal to the electronic lock to provide power to the electronic lock sufficient to actuate a lock mechanism 350 within the electronic lock 330. The power signal from the electronic access apparatus 310 is capable of actuating the electronic lock 330 even when there is no electrical conductor power connection to the electronic lock. In other words, the electronic lock is not physically connected to a permanent power supply (e.g., electrical mains or a battery). In some embodiments, the key 310 is the only source of electric power for the electronic lock. In some embodiments, the key 310 and/or light incident on a photovoltaic cell electrically connected to the electronic lock are the only sources of electric power for the electronic lock. In certain embodiments, the electronic access apparatus 310 does not have an electric power transmission interface that mechanically mates with a specific electric power reception interface of the electronic lock.

In some embodiments, the electronic access apparatus 310 can include a display with a user interface (e.g., a screen on a mobile phone) that displays a visual indication of a status of the electronic lock. The display can have control elements that are configured to control the operation of the electronic lock. For example, the user display can have buttons for a user to access the lock 330, such as lock, unlock, and temporarily unlock commands. The display can also be used to perform other administrative functions on the lock, such as programming the lock. A dedicated electronic key may have physical buttons that the user can press. In some embodiments the dedicated electronic key can have one or more light-emitting diodes that display the current status of the lock.

The electronic lock 330 includes memory 334, a lock microcontroller 332, an electromagnetic radiation receiver 338, a power management module 346, and an electronic latch 350. In some embodiments, the memory 334 and power management module 346 can be incorporated into the microcontroller 332. The electronic lock 330 can include electric circuitry that includes a Schottky diode 344 between the microcontroller 332 and the electromagnetic radiation receiver 338. The electronic lock can include a signal processing circuit 342. The memory 334 can be a nonvolatile memory device, such as NAND flash memory. The microcontroller 332 can also have an integrated memory.

The electromagnetic radiation receiver 338 can be hardware configured to receive electromagnetic radiation. For example the electromagnetic radiation receiver 338 can be an antenna, a photovoltaic cell, a sensor or other component capable of receiving electromagnetic radiation. The electromagnetic radiation receiver 338 is configured to can comprise one or more components. The electromagnetic radiation receiver 338 is configured to receive, at least, a wireless digital data signal, and a wireless power signal from an electronic access apparatus 310. The power signal and the data signal can be discrete signals that are received and processed separately. In some embodiments, the power signal is superimposed on the digital data signal. In some embodiments, the power signal and the data signal can be integrated into the power signal by pulsing the electromagnetic radiation on and off, the data can be modulated in the frequency-domain, time-domain, spatially, or in any combination. The electromagnetic radiation can be demodulated by the receiver on the electronic lock 330. The power signal can be received and be transferred to the microcontroller 332 through the diode 344. The data signal can be received and processed, or demodulated by the signal processing circuit (Analog Front End (AFE)) 342. The signal processing circuit can process and filter or demodulate the digital data signal before it is received by the microcontroller 332.

In some embodiments, the electromagnetic radiation receiver 338 can comprise multiple detector elements. For example, there can be a detector element that is configured to receive the data signal and a different detector element that is configured to receive the power signal. In one embodiment, the electromagnetic radiation receiver is a photovoltaic cell that is configured to receive the data signal and the power signal from the electronic access apparatus 310. A photovoltaic cell is configured to convert electromagnetic radiation (e.g., optical light) to energy to power the lock microcontroller. The electromagnetic radiation detector 338 can receive data signals via the electromagnetic radiation receiver 338. In some embodiments the electromagnetic radiation detector can comprise a transceiver that can transmit and receive electromagnetic radiation. In some embodiments the electronic access apparatus 310 can be greater than 0.5 centimeters from the electronic lock 330 when providing the power signal to the electromagnetic radiation receiver 338. In some embodiments the distance from the electromagnetic radiation receiver 338 can be less than or equal to about four centimeters, and in some embodiments, less than or equal to about ten centimeters. In some embodiments, the electronic lock 330 has a receiver mechanical configuration that need not match a mated transmitter mechanical configuration of the electronic access apparatus 310 in order to receive the power signal or data signal. The wireless power signal is configured to power all the circuits, the microcontroller 332, the power management module 346 and the lock mechanism 350.

The microcontroller 332 is configured to control operation of the lock mechanism based on the digital data signal received from the key 310. The microcontroller 332 can determine whether the key identifiers received from the key match the key access information stored in memory. The microcontroller 332 can send a signal to the lock mechanism 350 to actuate the lock if the key identifiers match. The microcontroller 332 can also receive key instructions for operating the lock, such as lock, unlock, or temporary unlock, from the electronic access apparatus 310. In some embodiments the microcontroller can operate the lock mechanism without specific key instructions. For example, the microcontroller can toggle the lock from a locked state to an unlocked state or visa-versa. The microcontroller 332 can also default to a temporary unlock state rather than toggling the state of the lock.

In operation, the microcontroller 332 can boot up automatically when a sufficient amount of power is received from the power signal to satisfy a power threshold. In some embodiments, a boot up circuitry can be used to monitor the power level until a threshold voltage is satisfied, as microcontrollers can sink most of the current during the bootup phase. In one embodiment a power-on-reset device can be used to measure the boot threshold and the microcontroller via an analog switch. After the microcontroller boots, the power-on-reset device can be shutdown to reduce overall system power consumption. The lock microcontroller 332 can communicate with the processor 312 via data signals that are transmitted and received by the electromagnetic radiation receiver 338.

In some embodiments, a digital data signal can cause the microcontroller 332 to enter a lock connection mode. When in the lock connection mode, the key processor 312 can communicate with the lock microcontroller 332 via the second electromagnetic radiation receiver. When certain criteria are satisfied, the lock microcontroller 320 can perform various operations, such as, for example, erasing a lock memory or replacing key access information stored in the lock memory 334.

The power management module 346 can monitor the electrical energy level in the lock 330 and determine when the electrical energy level satisfies a specific threshold. The power management module 346 can actuate the lock mechanism 350 after the electrical energy level of the electronic lock satisfies an electrical energy level threshold. For example, the power management module 346 can monitor the charge of capacitors within an electric circuit and, when the charge satisfies the threshold, the power management module can instruct the lock mechanism to actuate. In some embodiments the power management module 346 can utilize an electric circuit that is configured to increase the voltage above the voltage level of the power signal. For example, in one embodiment, the electric circuit can be configured to increase a voltage value that is not greater than 2.7 volts to a voltage value between 3.6 volts and 6.8 volts. In some embodiments, the power management module can use switches and capacitors to double or triple the voltage. This can be more efficient than using a power regulator such as a switching regulator, which has significant switching losses. The configuration of the power management module 346 can minimize power waste by only using one switch cycle to increase the voltage.

The lock mechanism 350 can be an electronic latch. The lock mechanism 350 can actuate between a locked state and an unlocked state based on a signal received from the microcontroller 332. The lock mechanism 350 can toggle between the locked and unlocked state. In other words, the lock mechanism 350 can change the state of the lock mechanism from locked to unlocked, or visa-versa. The lock will remain in the new state permanently without power, or until it has received another command from the microcontroller 332. In some embodiments the lock mechanism 350 can have a temporary unlock state. In the temporary unlock state; the lock mechanism 350 actuates the lock from the locked state to the unlocked state for a defined period of time. The defined period of time can be one second, two seconds, 5 seconds, or other period of time that the actuator can sustain based on the power provided by the electronic access apparatus 310. This period of time can be determined by size of the reservoir capacitor, efficiency of the sensor, and the strength of the wireless power signal. After the defined period of time, the lock mechanism 350 reverts back to the locked state. The lock mechanism can be a small efficient motor, piezoelectric latch or another style of latch or actuator that permits a relatively small amount of energy to actuate the latch. For example, the lock mechanism 350 may include a Servocell AL1 or AL3, an actuator available from Rutherford Controls an energy efficient latch that consumes less than an average of about 1.2 milliwatts, or another suitable variety of latch or actuator. The power signal provided by the electronic access apparatus 310 provides power to actuate the key mechanism 350. In some embodiments, the lock mechanism 350 is capable of actuating between the locked state and the unlocked state with less than or equal to about 10 milliwatts total lock system power consumption. This can be accomplished by building up the voltage to the limits of the lock mechanism. So that when the lock mechanism draws power, the latch can actuate before the voltage drops below the actuation threshold. In one embodiment, the piezo latch mechanism can initially draw up to 15 mA for approximately 50 ms to 75 ms in order to change states. A reservoir capacitor monitored by the microcontroller, can be used for the initial supply of current.

Figure 4:
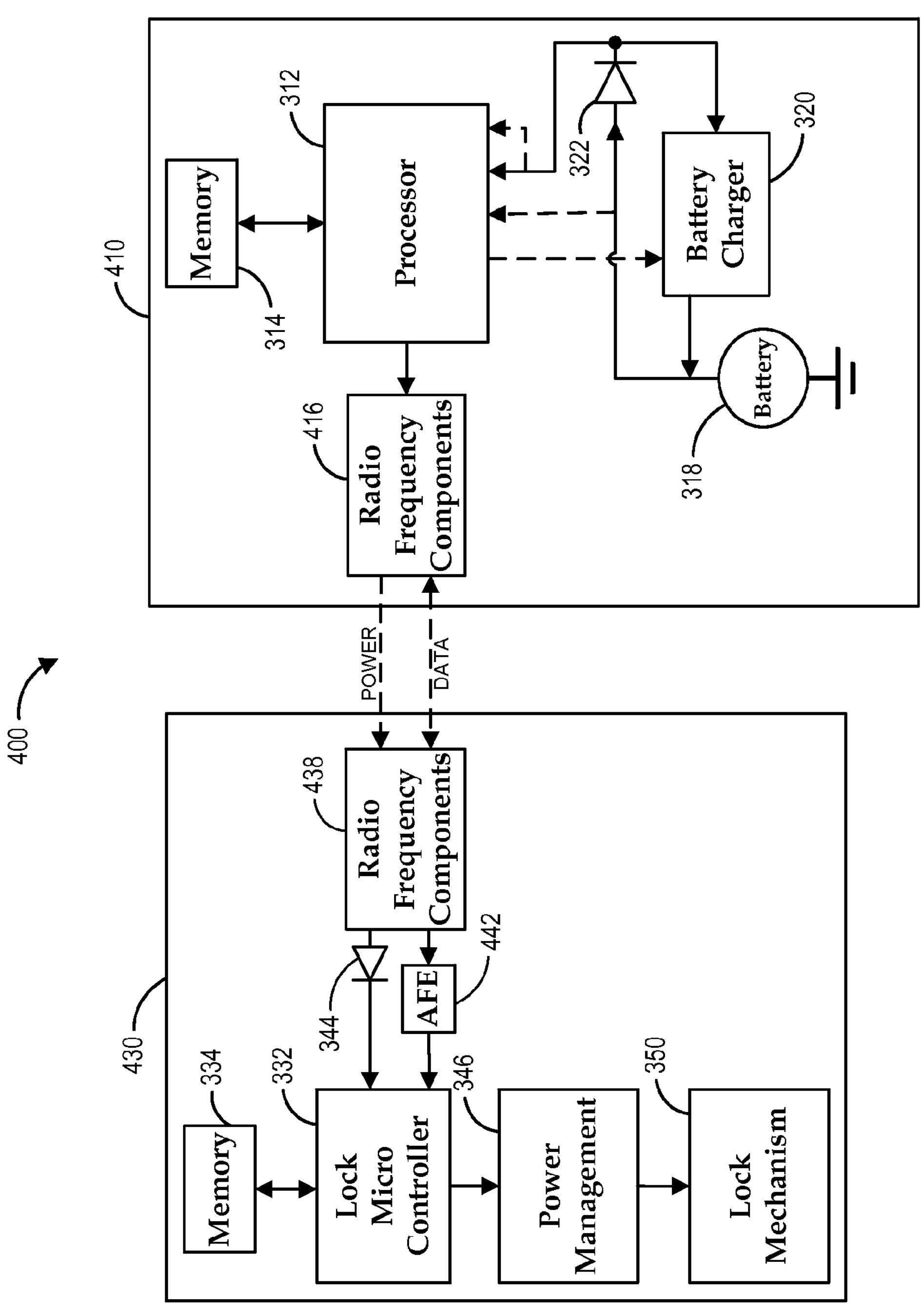
FIG. 4 is a detailed block diagram of another embodiment of an electronic lock and an electronic access apparatus.

FIG. 4 is a block diagram of another embodiment of an electronic lock and key system 400 including an electronic access apparatus 410 and an electronic lock 430. In this embodiment, the electronic key 410 includes a housing that contains a processor 312, memory 314, a battery 318, and a battery charger 320, which are substantially the same as the components having the same reference numbers and described in association with FIG. 3. The electronic lock includes microcontroller 332, memory 334, power management module 346, and lock mechanism 350, which are substantially the same as the components having the same reference numbers and described in association with FIG. 3.

The electronic access apparatus, such as a smart phone or electronic key, 410 also includes radio frequency (RF) components 416 for communicating with the electronic lock 430. In some embodiments, the electronic access apparatus 410 and the electronic lock 430 can use radio frequency identification (RFID) and/or near field communication (NFC) protocols to communicate and provide power. The RF components 416 on the electronic access apparatus 410 can include, for example, an antenna, a transceiver, modulator and a decoder/demodulator. The electronic lock 430 can include corresponding RF components 438, such as a transponder. Radio frequency based communication can be established between the processor 312 in the electronic access apparatus 410 and the microcontroller 332 in the electronic lock 430. The RF communication can allow the transfer of power between the electronic access apparatus 410 and the electronic lock 430. The power can be transferred via contactless inductive coupling between the electronic access apparatus 410 and the electronic lock 430 In some embodiments, the power transfer can occur when the electronic access apparatus 410 is positioned at up to four centimeters from the electronic lock 430. In some embodiments, it can be up to ten centimeters.

Figure 5:
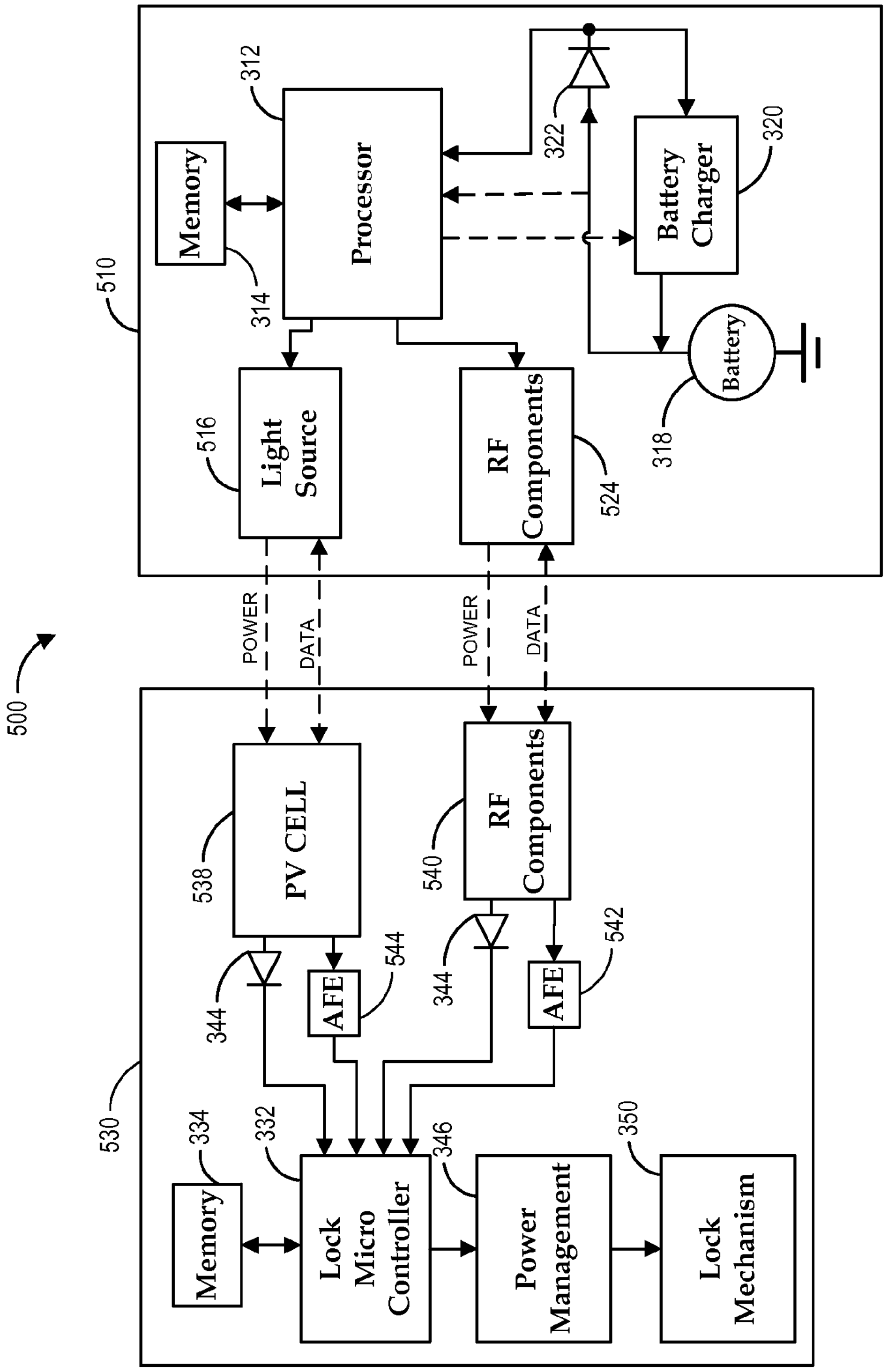
FIG. 5 is a detailed block diagram of yet another embodiment of an electronic lock and an electronic access apparatus.

In this embodiment, the power provided by the electronic access apparatus 410 can provide enough power to boot the microcontroller 332, power the power management module 346 and actuate the lock mechanism 350. In order to activate the lock mechanism 350 the power management module 346 may need to increase the voltage of the power signal received from the electronic access apparatus 410. In some embodiments, the power management module can use switches and capacitors to increase the voltage rather than a voltage regulator device. In one embodiment the voltage value of the power signal is not greater than 2.7 volts and is increased to a voltage value between 4 volts and 6.8 volts in order to actuate the lock mechanism. In some embodiments, the voltage value may not need to be boosted to actuate the lock mechanism. In some embodiments, the receiver can be designed or selected to supply a sufficient amount of voltage and power to the lock. The microcontroller can monitor the voltage threshold and operate within the min and max specifications of the locking mechanism FIG. 5 is a block diagram of another embodiment of an electronic lock and key system 500 including an electronic access apparatus 510 and an electronic lock 530. In this embodiment, the electronic access apparatus 510 includes a housing that contains a processor 312, memory 314, a battery 318, and a battery charger 320, which are substantially the same as the components having the same reference numbers and described in association with FIG. 3. The electronic lock 530 includes a microcontroller 332, memory 334, power management module 346, and lock mechanism 350, which are substantially the same as the components having the same reference numbers and described in association with FIG. 3.

The electronic access apparatus, such as a smart phone, 510 includes an optical light source 516 and radio frequency components 524. The optical light source 516 is configured to emit optical light from the electronic access apparatus 510 to provide power to the electronic lock 530. The RF components 524 include an antenna and necessary components necessary to emit and receive radio waves. The RF components are configured to transmit digital data signals to the electronic lock 530. The RF components can also receive digital data signals from the electronic lock 530. Combining both RF and PV components can increase the supply of power to the electronic lock 530, which can result in quicker access and/or provide auxiliary power for added features such as an LED or display. In some embodiments, the electronic access apparatus 510 is configured to transmit both power and data signals from the optical light source 516 and the RF components 524. In some embodiments, the optical light source only provides the power signal and the RF components only provide the data signal.

The electronic lock 530 includes a photovoltaic cell 538 and corresponding RF components 540. The photovoltaic cell 538 is configured to convert electromagnetic radiation (e.g., optical light) to energy to power the lock microcontroller 332, the power management module 346, and the lock mechanism 350. The photovoltaic cell 538 can have an associated signal processing circuit 544 to process a digital data signal. The RF components 540 are configured to receive a digital data signal from the electronic access apparatus 510. The RF components 540 are also configured to transmit digital data signals to the electronic access apparatus 510. The RF components 540 can have an associated signal processing circuit 542 to process a digital data signal. In some embodiments, the RF signal can also supply a portion of the power by powering analog front end device. In some embodiments, the electronic access apparatus 510 is configured to transmit both power and data signals from the optical light source 516 and the RF components 524. In some embodiments, the optical light source only provides the power signal and the RF components only provide the data signal. In such embodiments, the signal processing circuit 544 associated with the photovoltaic cell can be omitted and/or the diode 344 associated with RF components 540 can be omitted.

The electronic access apparatus 510 can transfer power to the electronic lock 530 via the optical light source 516. The optical light source 516 is configured to emit optical light onto the photovoltaic cell 538 on the electronic lock 530. The photovoltaic cell 538 is configured to convert the optical light to power. After sufficient power has been transferred from the electronic access apparatus 510 to the electronic lock 530, the microcontroller 332 boots up and can process the digital data signal received at the RF components 540. The microcontroller 332 verifies the key identifiers and sends the command to actuate the lock mechanism 350.

Figure 6:
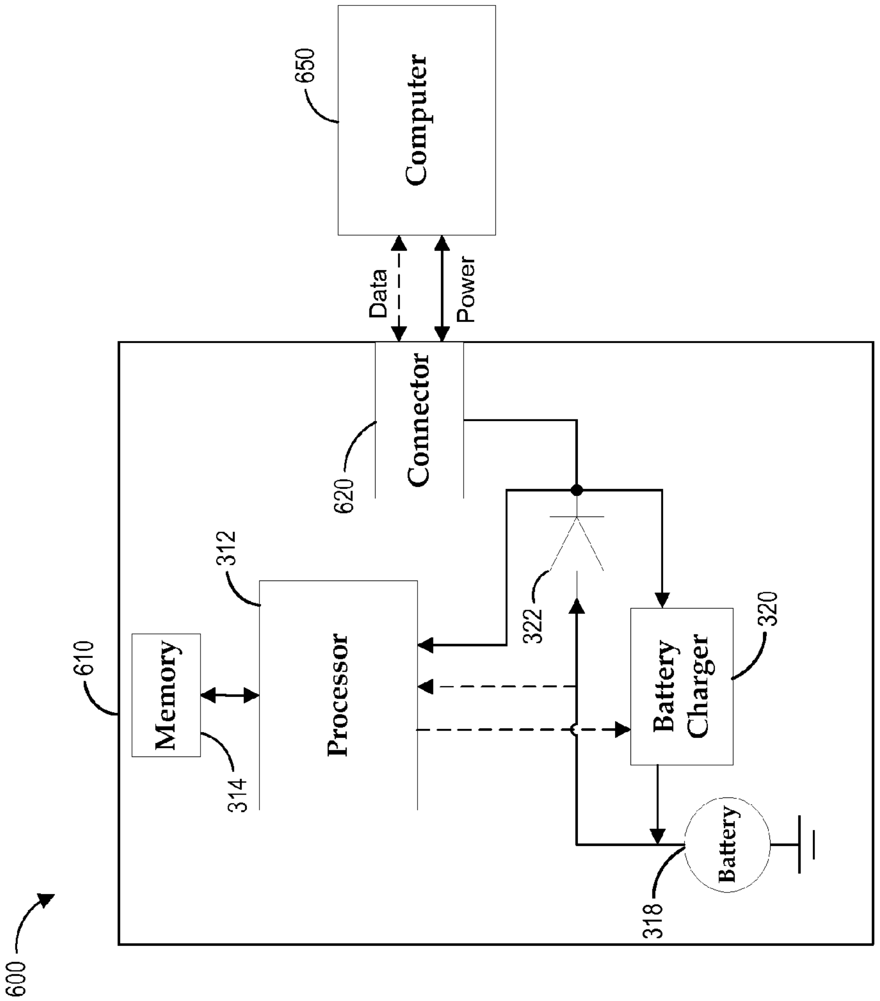
FIG. 6 is a block diagram of an embodiment of a computer connected to an electronic access apparatus.

FIG. 6 shows a detailed block diagram of an embodiment of a computer 650 connected to an electronic access apparatus that includes a rechargeable battery 330 via a connector 620. The computer 650 can be, for example, a device containing a host USB interface, a desktop computer, flash drive a notebook computer, a handheld computer, a mobile phone, or another type of computing device.

In one embodiment, the electronic access apparatus 610 is connected to the computer via a USB connector 620. When Pin 1 of the USB connector is connected to a powered USB pin (for example, on a computer 650 or on a USB charging device, not shown), the electric potential on Pin 1 is higher than the electric potential at the battery 318 terminal, the output of the comparator changes, and the diode 322 is open or "off." In this state, the electric potential on Pin 1 is substantially equal to the electric potential supplied by a powered USB bus when the USB connector is plugged into a computer. The output change of comparator will trigger the computer mode interrupt or reset of the processor 312. The processor 312 will enter a computer connection mode. In PC mode that computer can update the keys LCF files to reconfigure the lock and also allow the key to be used a USB memory storage thumb or flash drive. In some embodiments, the USB connector can have four pathways or pins: a power supply pin (Pin 1), a data with clock recovery pin (Pin 2), a data and clock pin (Pin 3), and a ground pin (Pin 4). The D− pin (Pin 2) and D+ pin (Pin 3) are used to transmit differential data signals with encoding that the USB transceivers use to recover a clock. The computer can supply USB data with clock recovery encoding via pins of the computer's USB interface. The USB transceiver can assist in communications between the key and the computer 350. In some embodiments, the processor 312 provides instructions to the battery charger 328 for charging the battery 330 while in the computer connection mode. For example, the battery charger 328 can be a Linear Tech LTC4065L from Linear Technology of Milpitas, Calif., a battery charger for a lithium ion battery, or another suitable battery charger.

Figure 7A:
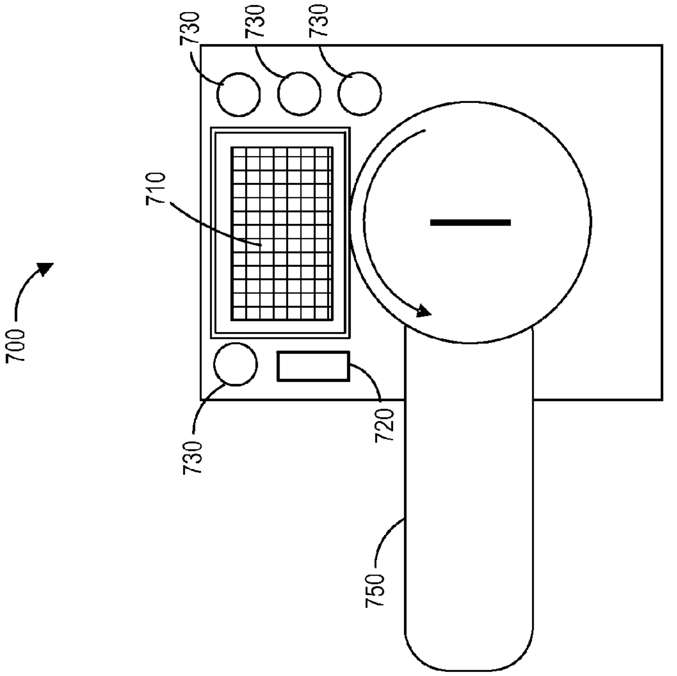
FIGS. 7A-7B illustrate an embodiment of an electronic lock and door handle.
Figure 7B:
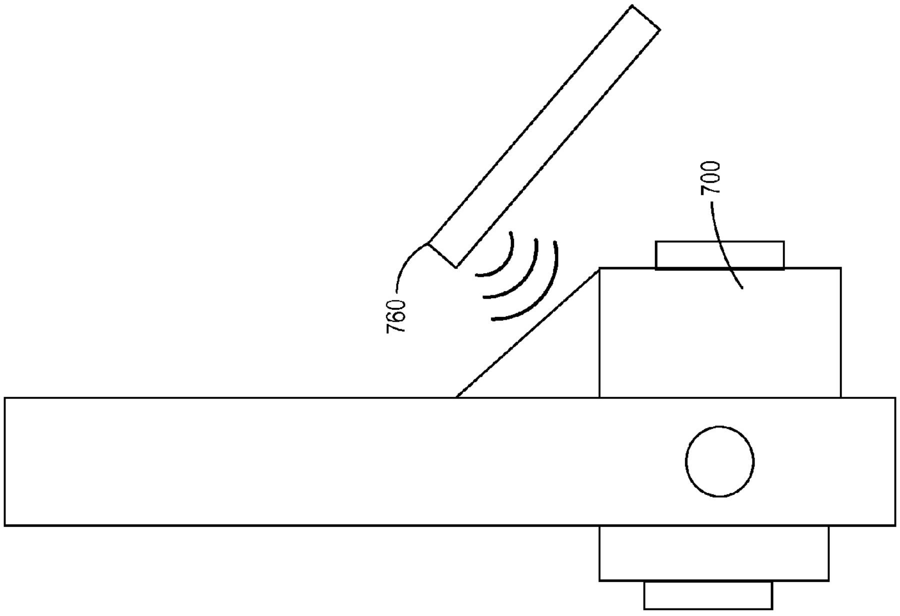

FIGS. 7A and 7B illustrate and embodiment of an electronic lock 700. FIG. 7A illustrates a front view and FIG. 7B illustrates a side view of the electronic lock 700. The electronic lock 700 includes an electromagnetic radiation detector 710, such as a photovoltaic cell or antennae or both, an electrical interface port 720, a plurality of light-emitting diodes (LED) 730, and a handle mechanism 750. The electromagnetic radiation detector 710 can be configured to convert optical light or RF signals to energy as described in association with FIGS. 3, 4 and 5. The electrical interface port 720 can be a USB port or other type of mechanical port that establishes communication with the microcontroller of the electronic lock 700. The port 720 can be used as a secondary source of the power and/or data communication for the electronic lock 700 if an electronic access apparatus is not available to provide power to the electronic lock 700 via the electromagnetic radiation detector 710.

In some embodiments, the LEDs 730 can be configured to have different colors to indicate a status of the lock 700. The LEDs 730 can illuminate after the electronic lock 700 has received power. For example, each LED 730 could represent a different state of the lock, such as locked, unlocked, lock programmed, processing, key identifier accepted, or other status. The microcontroller of the lock can control which LED illuminates.

FIG. 7B helps illustrates an embodiment of the shape of the housing of the electronic lock 700. The electronic lock 700 can be shaped such that the electromagnetic radiation detector 710 can be more easily disposed to receiving optical light from solar radiation when using a photovoltaic cell and the lock 700 is outside. The angle of the photovoltaic cell can also help to facilitate communication between the electronic lock 700 and an electronic access apparatus 760. In some embodiments, the electronic lock 700 can be configured so that it is substantially planar with the door.

Figure 8:
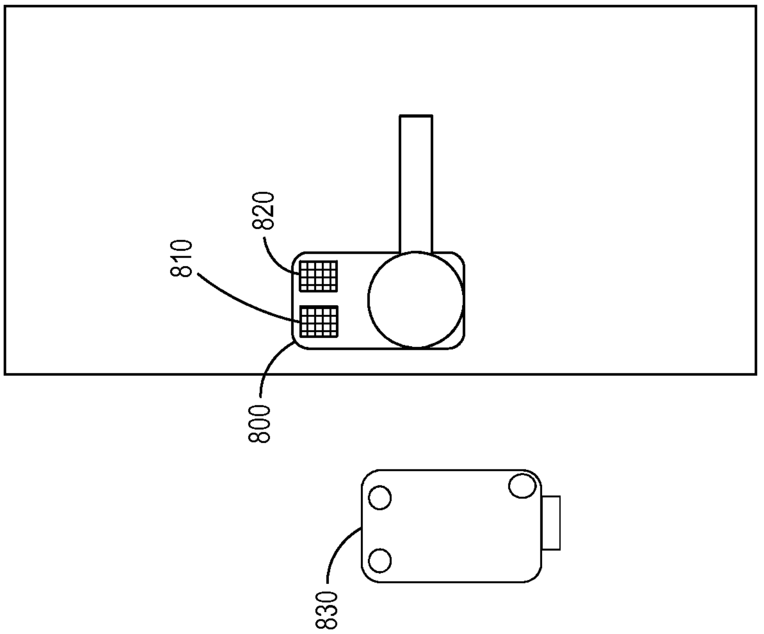
FIG. 8 illustrates another embodiment of an electronic lock and door handle.

FIG. 8 illustrates another embodiment of an electronic lock 800 and an electronic access apparatus 830. In this embodiment the electronic lock 800 has a first electromagnetic radiation detector 810, such as a photovoltaic cell or antennae and a second electromagnetic radiation detector 820, such as a photovoltaic cell or second antennae. The first electromagnetic radiation detector 810 is configured to unlock the electronic lock and the second electromagnetic radiation detector 820 is configured to lock the electronic lock. The electronic access apparatus 830 can be a button-less controller that can lock or unlock the lock 800 based on which electromagnetic radiation detector receives power from the electronic access apparatus 830. In some embodiments, an electronic button-less key can be used with only a single electromagnetic radiation detector by toggling from lock to unlock. In one embodiment, this can be done by writing the state of the lock in nonvolatile memory of microcontroller once a match is determined and before the microcontroller decides to actuate the lock mechanism. In these instances the photovoltaic cell can cause the lock mechanism to toggle the current state of the lock (e.g., lock to unlock and visa-versa).

Figure 9:
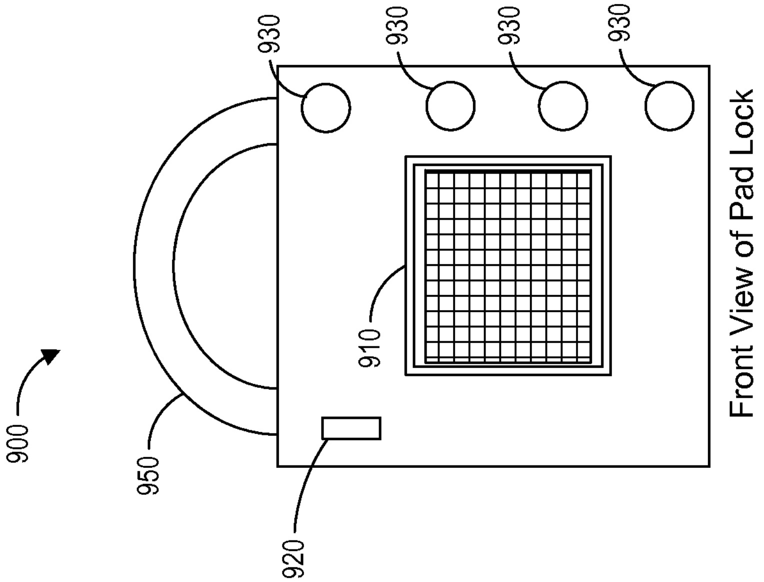
FIG. 9 illustrates an embodiment of an electronic pad lock.

FIG. 9 illustrates a mobile electronic pad lock 900. The electronic pad lock 900 includes an electromagnetic radiation detector 910, such as a photovoltaic cell or antennae, an electrical interface port 920, a plurality of light-emitting diodes 930, and a lock mechanism 950. The electronic pad lock functions in substantially the same manner as the other electronic locks described herein. In some embodiments, the electronic pad lock 900 can also include a geographic location component that is configured to only allow access to the lock when the lock is within a specific geographic area. The electronic access apparatus, such as a smart phone, can provide the global positioning system (GPS) location in order to determine the location of the pad lock 900. The pad lock 900 can be configured to unlock or lock, only if the lock is within a specific geographic area (e.g., specific geographic coordinates). This can be the case even if the key identifiers match. In some embodiments, the pad lock 900 can have more than one geographic position associated with it (e.g., home and work).

Figure 10:
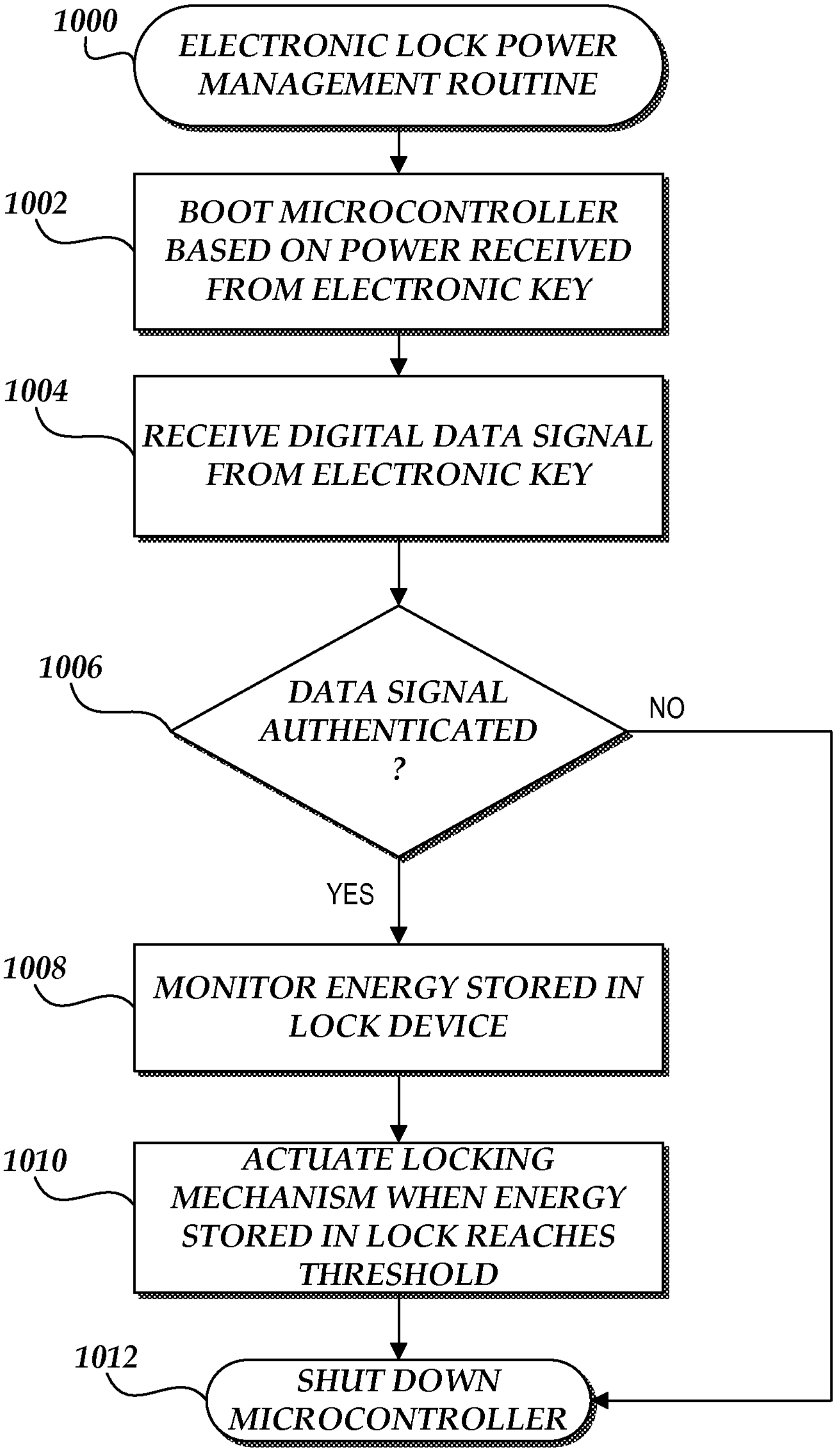
FIG. 10 is a flowchart of an embodiment of an electronic lock power management routine.

FIG. 10 is an embodiment of an electronic lock power management routine 100. The electronic lock power management 1000 routine can be implemented by the microcontroller within an electronic lock. At block 1002, the microcontroller can boot up after the electronic lock has received power from the electronic access apparatus. The microcontroller can have a power threshold such that it boots automatically once enough power has been transferred from the electronic access apparatus to the electronic lock.

At block 1004, the microcontroller can process the digital data signal received from the electronic access apparatus. In some embodiments, the digital data signal can include key identifiers. The key identifiers can include a at least one or more public key and a private keys. At block 1006 the microcontroller authenticates that the digital data includes the correct authentication data. In one embodiment the microcontroller determines whether the key identifiers match the data stored in the key access information file stored in the memory on the electronic lock. If the authentication data provided in the digital data signal is incorrect, the microcontroller shuts down at block 1012. If the authentication data provided in the digital data signal is correct, then the routine proceeds to block 1008.

At block 1008, the microcontroller monitors the power received from the electronic access apparatus. The electronic access apparatus can transmit power simultaneously with the digital data signal. The power can continue to be stored within the electronic lock during authentication at blocks 1004 and 1006. At block 1010, the microcontroller sends the signal to actuate the lock mechanism when the electrical energy level reaches a lock activation threshold. In some embodiment, after the signal has been sent by the microcontroller, a power management module can boost the voltage of the power signal in order to actuate the lock mechanism. In some embodiments, the process of transferring power and authentication of the key can take less than about five seconds, less than about four seconds, less than about three seconds, less than about two seconds, less than about one second, or time range between any of these times. The amount of time can be dependent upon the strength of the power signal or efficiency of the sensor. A stronger power signal can decrease the amount of time and a weaker power signal can increase the amount of time. At block 1012, the microcontroller shuts down.

Figure 11:
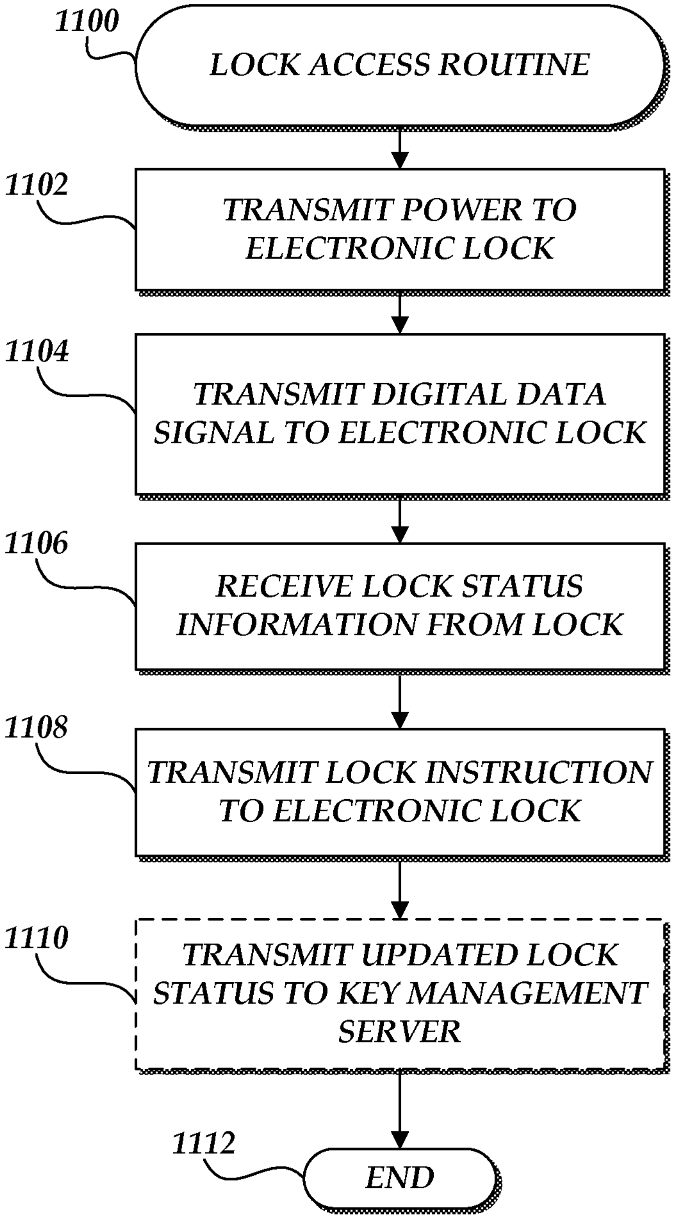
FIG. 11 is a flowchart of an embodiment of a lock access routine for an electronic access apparatus.

FIG. 11 illustrates an illustrative embodiment of a lock access routine 1100. The lock access routine can be implemented by an electronic access apparatus. At block 1102 the electronic access apparatus transmits a power signal to an electronic lock. The microcontroller boots up after receipt of the power signal and can communicate with the electronic access apparatus.

At block 1104, the electronic access apparatus transmits a digital data signal to the electronic lock. In some embodiments, the digital data signal can include key identifiers that are stored on the electronic access apparatus and used to access the lock. The key identifiers can include at least one or more private identifiers and public identifiers. If the electronic access apparatus provides the correct authentication data (e.g., key identifiers), the electronic lock can provide lock instructions in order to actuate the electronic lock.

At block 1106, the electronic access apparatus receives information from the electronic lock providing the current status of the lock (e.g., locked or unlocked). The electronic access apparatus can provide the lock status to the user by way of a user interface display, an LED, or other indication. In some embodiments the lock status will display on the electronic access apparatus, or smart phone and/or on the electronic lock. At block 1108 a lock instruction is transmitted from the electronic access apparatus to the electronic lock. The lock is actuated based on the lock instruction.

At block 1112, optionally after the lock has actuated the electronic access apparatus can transmit an updated lock status to an access control system, such as the access control system illustrated in FIG. 2. The access control system can maintain the status of all the locks within each domain.

It is recognized that the term "module" may include software that is independently executable or standalone. A module can also include program code that is not independently executable. For example, a program code module may form at least a portion of an application program, at least a portion of a linked library, at least a portion of a software component, or at least a portion of a software service. Thus, a module may not be standalone but may depend on external program code or data in the course of typical operation.

Although systems and methods of electronic access control are disclosed with reference to preferred embodiments, other embodiments will be apparent to those of ordinary skill in the art from the disclosure herein. Moreover, the described embodiments have been presented by way of example only, and are not intended to limit the scope of the inventions. Rather, a skilled artisan will recognize from the disclosure herein a wide number of alternatives for the exact ordering the steps, how an electronic access apparatus is implemented, how an electronic lock is implemented, or how an admin application is implemented. Other arrangements, configurations, and combinations of the embodiments disclosed herein will be apparent to a skilled artisan in view of the disclosure herein and are within the spirit and scope of the inventions as defined by the claims and their equivalents.

What is claimed is:

1. A rechargeable electronic apparatus for use with an electronic lock, the apparatus comprising:

a housing comprising:

a processor configured to communicate with a lock microcontroller associated with the electronic lock;

a memory device storing a key identifier;

a rechargeable battery, configured to supply energy to components of the apparatus;

an electromagnetic radiation source configured to transmit a wireless digital data signal to an electromagnetic radiation receiver, transmit a wireless power signal to the electronic lock to provide power to the electronic lock sufficient to actuate a lock mechanism within the electronic lock, wherein the electronic lock is configured to remain in a locked state without power being supplied by the electronic apparatus and the electronic lock is configured to remain in an unlocked state without power being supplied by the electronic apparatus, wherein the wireless power signal delivers less than or equal to 50 millijoules of electric energy to the electronic lock, wherein the wireless power signal lasts for less than or equal to five seconds, wherein the electric power provided to the electronic lock is less than or equal to 10 milliwatts, wherein the electronic lock has at least one capacitor configured to store the electric energy transmitted to electromagnetic radiation receiver and provide electric power to the electronic lock, wherein a voltage of the electric power supplied to the electronic lock drops while the electronic lock is actuated, wherein the electronic lock is configured to actuate using electric power received during transmission of the wireless power signal; and wherein the electromagnetic radiation source is configured to transmit the key identifier to the lock microcontroller via the digital data signal, wherein the apparatus is capable of actuating the electronic lock without any electrical conductor power connection to the electronic lock, wherein the apparatus and/or optical light incident on the electronic lock are the only sources of electric power for the electronic lock.

2. The apparatus of claim 1, wherein the electromagnetic radiation source is configured to transmit power via an optical light source.

3. The apparatus of claim 1, wherein the housing comprises a display, the display having a user interface having a visual indication of a status of the electronic lock, and one or more control elements configured to control the operation of the electronic lock.

4. The apparatus of claim 1, wherein the apparatus is a mobile phone or an electronic key.

5. The apparatus of claim 1, wherein the apparatus does not have a mechanical configuration that is configured to match a mating mechanical configuration of the electronic lock.

6. The apparatus of claim 1, wherein the electromagnetic radiation source configured to transmit the wireless digital data signal and the wireless power signal is the same.

7. The apparatus of claim 1, wherein the electromagnetic radiation source comprises an antenna configured to transmit radio frequency signals.

8. The apparatus of claim 7, wherein the antenna is configured to transmit the digital data signal and the power signal to the electronic lock.

9. The apparatus of claim 8, wherein the antenna is configured to transmit the power signal to the electronic lock via contactless inductive coupling.

10. An electronic lock capable of being locked and unlocked with a handheld electronic apparatus, the electronic lock comprising:

a lock housing;

a lock mechanism electrically connected to a lock microcontroller, the lock mechanism configured to actuate between a locked state and an unlocked state;

an electromagnetic radiation receiver configured to receive an electromagnetic wireless digital data signal from the handheld electronic apparatus, and receive an electromagnetic wireless power signal from the electronic apparatus;

a memory device storing key access information;

the lock microcontroller configured to control operation of the lock mechanism based on the digital data signal from the electronic apparatus; and a capacitor configured to store electric energy received by the electromagnetic radiation receiver and provide electric power to the lock mechanism;

a power management module configured to actuate the lock mechanism based on input received from the lock microcontroller and an electrical energy level of the capacitor, wherein a voltage of the electric power supplied to the lock mechanism drops while the lock mechanism is actuated;

wherein the lock mechanism is capable of actuating between the locked state and the unlocked state without any electrical conductor power connection to the electronic lock, wherein the lock mechanism is configured to remain in a locked state without power being supplied by the electronic us and the lock mechanism is configured to remain in an unlocked state without power being supplied by the electronic apparatus;

wherein the wireless power signal delivers less than or equal to 50 millijoules of electric energy to the electronic lock, wherein the wireless power signal lasts for less than or equal to five seconds, wherein the electric power provided to the electronic lock is less than or equal to 10 milliwatts, wherein the lock mechanism is configured to actuate using electric power received from the wireless power signal during transmission of the wireless power signal, and wherein the apparatus and/or optical light incident on the electromagnetic radiation receiver are the only sources of electric power for the electronic lock.

11. The electronic lock of claim 10, wherein the digital data signal comprises a key identifier, and wherein lock microcontroller is further configured to determine whether the key identifier matches the key access information stored in the memory device.

12. The electronic lock of claim 10, wherein the lock mechanism is capable of actuating between the locked state and the unlocked state with less than or equal to 10 milliwatts and the electronic apparatus can be greater than 0.5 centimeters from the electronic lock when providing power.

13. The electronic lock of claim 10, wherein the electronic lock does not have a mechanical configuration that is configured to match a mating mechanical configuration of the electronic apparatus.

14. The electronic lock of claim 10, wherein the power management module is configured to actuate the lock after the electrical energy level of the electronic lock reaches an electrical energy level threshold.

15. The electronic lock of claim 14, wherein the power management module is configured to increase the voltage to actuate the lock.

16. The electronic lock of claim 15, wherein the power management module comprises a voltage conversion circuit that is configured to increase a voltage value that is not greater than 2.7 volts to a voltage value between 3.6 volts and 6.8 volts.

17. The electronic lock of claim 10, wherein the electromagnetic radiation receiver comprises an electromagnetic radiation sensor and a signal processing circuit, wherein the signal processing circuit is configured to process digital data signal received from the electronic apparatus.

18. The electronic lock of claim 10, wherein the electromagnetic radiation receiver comprises an antenna configured to receive radio frequency signals.

19. The electronic lock of claim 18, wherein the antenna is configured to receive the digital data signal and the power signal from the electronic apparatus.

20. The electronic lock of claim 19, wherein the antenna is configured to receive the power signal from the electronic apparatus via contactless inductive coupling.

21. The electronic lock of claim 19, wherein the lock mechanism is configured to toggle between the locked state and the unlocked state based on a lock instruction received from the electronic apparatus.

22. The electronic lock of claim 10, wherein the electromagnetic radiation receiver is not a photovoltaic cell.

23. An method of locking or unlocking an electronic lock using a handheld electronic apparatus, the method comprising:

receiving, by an electromagnetic radiation receiver, electromagnetic radiation from the handheld electronic apparatus, wherein the electromagnetic radiation comprises a power signal configured to provide electric power to the electronic lock;

booting a lock microcontroller after an electrical energy level satisfies an electrical energy level threshold;

receiving, by the electromagnetic radiation receiver, electromagnetic radiation comprising a digital data signal from the electronic apparatus, the digital data signal comprising a key identifier;

determining, by the lock controller, whether the key identifier matches key access information stored in memory in the electronic lock;

storing electric energy received from the electronic apparatus in a capacitor in the electronic lock;

if the key identifier matches the key access information, actuating a lock mechanism when the stored electric energy in the capacitor reaches an energy level threshold by providing electric power to the lock mechanism from the capacitor, wherein a voltage of the electric power supplied to the lock mechanism drops while the lock mechanism is actuated, wherein the lock mechanism is configured to actuate between a locked state and an unlocked state, wherein the lock mechanism is configured to remain in the locked state without power being supplied to the lock mechanism and the lock mechanism is configured to remain in an unlocked state without power being supplied by the electronic apparatus;

wherein the electronic lock consumes less than or equal to 50 millijoules of electric energy when locking or unlocking, wherein the wireless power signal lasts for less than or equal to five seconds, wherein the electric power provided to the electronic lock is less than or equal to 10 milliwatts; and wherein the lock mechanism is configured to actuate using electric power received from the power signal during transmission of the power signal.

24. The method of claim 23, wherein the key access information is stored in memory in the electronic lock.

25. The method of claim 23, wherein the electronic lock is capable of actuating the lock mechanism without the handheld electronic apparatus physically contacting the electronic lock.

26. The electronic lock of claim 1, wherein the wireless power signal is compliant with the near field communication (NFC) protocol.

27. The electronic lock of claim 1, wherein the wireless power signal lasts for less than or equal to three seconds.

28. The electronic lock of claim 10, further comprising a capacitor in electrical communication with the power management module, wherein the power management module is configured to monitor a charge state of the capacitor and actuate the lock mechanism when the charge state of the capacitor satisfies an electrical energy level threshold.

29. The electronic lock of claim 28, wherein the electrical energy level threshold is less than or equal to 30 millijoules.

30. The electronic lock of claim 10, wherein the power management module is configured to increase the voltage to a limit of the lock mechanism in order to actuate the lock mechanism before the voltage drops below an actuation threshold of the lock mechanism.

* * * * *

UNITED STATES PATENT AND TRADEMARK OFFICE

CERTIFICATE OF CORRECTION

PATENT NO. : 8,922,333 B1
APPLICATION NO. : 14/023248
DATED : December 30, 2014
INVENTOR(S) : Gregory Paul Kirkjan It is certified that error appears in the above-identified patent and that said Letters Patent is hereby corrected as shown below:

ON THE TITLE PAGE

In column 1 (page 2, item 56) at line 16, Under U.S. Patent Documents, change "Buckingham" to --Yang--.

IN THE CLAIMS

In column 18 at line 13 (approx.), In Claim 10, change "us" to --apparatus--.

In column 19 at line 4, In Claim 21, change "claim 19," to --claim 10,--.

Signed and Sealed this
Sixteenth Day of February, 2016

Michelle K. Lee
*Director of the United States Patent and Trademark Office*